United States Patent [19]
Levit

[11] Patent Number: 5,669,529
[45] Date of Patent: Sep. 23, 1997

[54] RUNNER'S WRIST-BORNE WEIGHT AND WATER DISPENSER

[76] Inventor: Hiram B. Levit, 224 Warwick Ave., S. Orange, N.J. 07079

[21] Appl. No.: 445,541

[22] Filed: May 22, 1995

[51] Int. Cl.⁶ ............................................. B67D 3/00
[52] U.S. Cl. .................... 222/78; 222/105; 222/175; 222/192; 222/212; 482/74; 482/106
[58] Field of Search ........................ 222/78, 92, 105, 222/175, 192, 212; 482/74, 106, 108

[56] References Cited

U.S. PATENT DOCUMENTS

| | | | |
|---|---|---|---|
| 2,649,995 | 8/1953 | Muskin | 222/92 |
| 4,702,473 | 10/1987 | Paquette | 222/175 |
| 4,703,927 | 11/1987 | Hanzlik | 482/74 |
| 4,712,794 | 12/1987 | Hall | 482/74 |
| 4,720,098 | 1/1988 | Gordon | 482/74 X |
| 4,768,688 | 9/1988 | Harrigan | 222/530 |
| 5,332,119 | 7/1994 | Davis | 222/78 |
| 5,431,308 | 7/1995 | Tchen | 222/175 |

*Primary Examiner*—Joseph Kaufman

[57] ABSTRACT

An arcuately-formed reservoir, having collapsible, accordion-pleated sides, provides a supply of drinking water which, also, serves as a weighting medium. A compliant sheathing is used to enclose the reservoir therewithin. A pair of sheathed reservoirs are carried on the wrists of a jogger or runner. The reservoir has a closure cap, with a water-dispensing control valve therein, and the sheathing has an aperture formed therein through which the cap and valve protrude.

1 Claim, 2 Drawing Sheets

RUNNER'S WRIST-BORNE WEIGHT AND WATER DISPENSER

This invention pertains to jogger's and runner's paraphernalia, such as weighting means and water bottles, and the like, and in particular to a novel article in which weighting means and water dispensing are combined integrally.

It is customary for exercisers, notably joggers and runners, to carry separate weights, hand-held, usually, to enhance the benefit of the jogging or running exercise. In addition, to insure against dehydration, they also carry water bottles, or have it arranged that, at sites along the course, potable water will be available to them.

What has been needed is a novel way in which the very potable water, necessary to the runner or jogger, can be carried by other than the hands, and serve as well as the supplemental weighting.

It is therefore an object of this invention to set forth means which satisfy the aforesaid need.

Particularly, it is an object of this invention to disclose a runner's wrist-borne weight and water dispenser, comprising a reservoir, of arcuate conformation; wherein said reservoir has an outlet; and a closure removably secured over said outlet. Further, it is an object of this invention to set forth means for sheathing said reservoir therewithin.

Further objects of this invention, as well as the novel features thereof, will become apparent by reference to the following description, taken in conjunction with the accompanying figures, in which.

Figure 1:
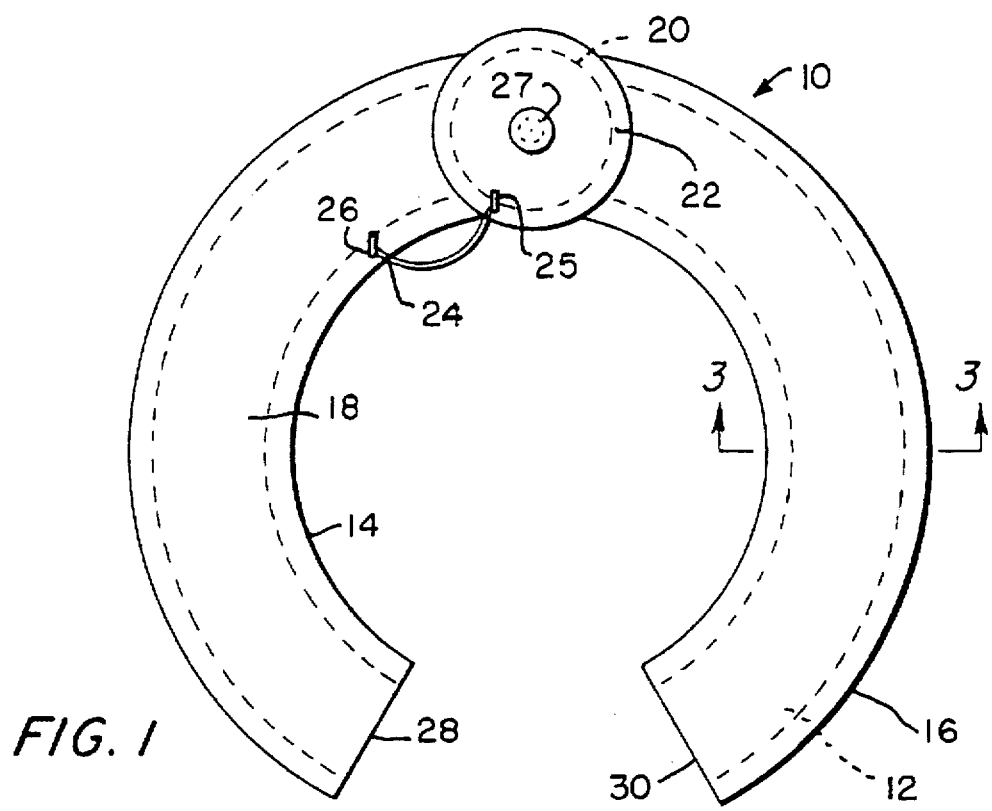
FIG. 1 is a top or plan view of the inventive reservoir, outlet and closure.
Figure 2:
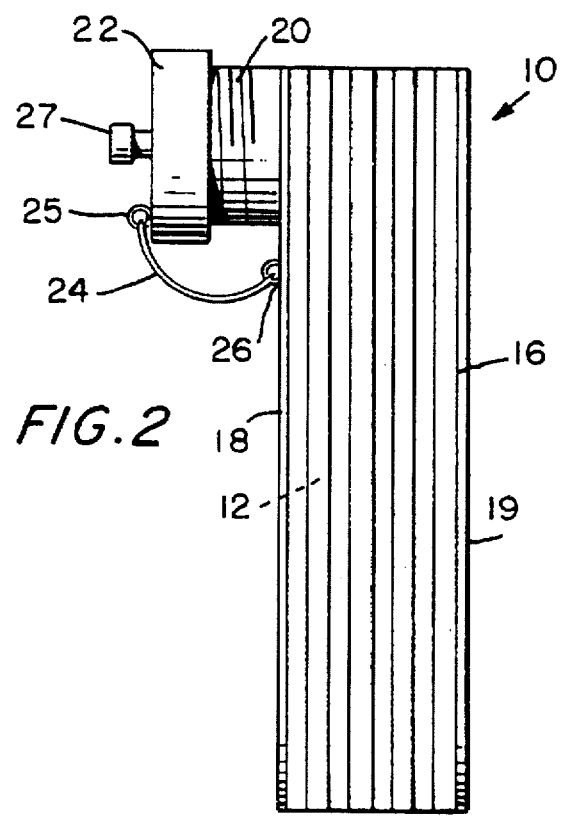
FIG. 2 is a side elevational view thereof, substantially collapsed.
Figure 3:
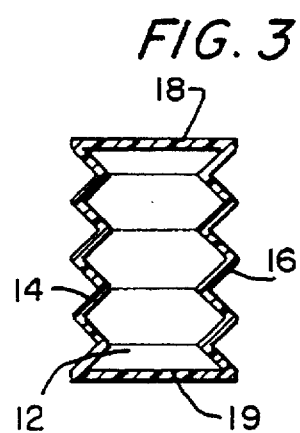
FIG. 3 is a cross-sectional view taken along section 3—3 of FIG. 1, and shown substantially expanded.

As shown in FIGS. 1 through 3, the novel invention 10 comprises a reservoir 12 having accordion-pleated sides 14 and 16, and of a generally arcuate conformation. The top 18 of the reservoir 12, and the bottom 19 are flat, albeit curved into the arcuate shape. Intermediate the length of the top 18 is an externally-threaded, short tube 20 which is integral with the reservoir 12 and which opens thereinto. A closure cap 22, internally-threaded, is removably engaged with the tube 20. The cap 22 is tethered to the reservoir 12 by means of a short length of plastic cord 24 fixed to the cap 22 by means of a swivel 25, and secured at the opposite end thereof to an eye 26. A valve 27, centered in the cap 22, is provided for controlling the release of the reservoir-confined drinking water.

Without more, the invention 10 will satisfy the aforesaid long sought need. The cap 22 can be removed, in order to fill the reservoir with potable water, and the reservoir can be carried on the wrist of the runner or jogger, by slipping the wrist into the ends 28 and 30 of the reservoir 12. Accordingly, the water-filled reservoir 12 will provide the necessary weighting, and during the course of the exercise, the runner or jogger has with him or her the requisite water for drinking purposes. However, the invention further includes means for sheathing the reservoir 12.

Figure 4:
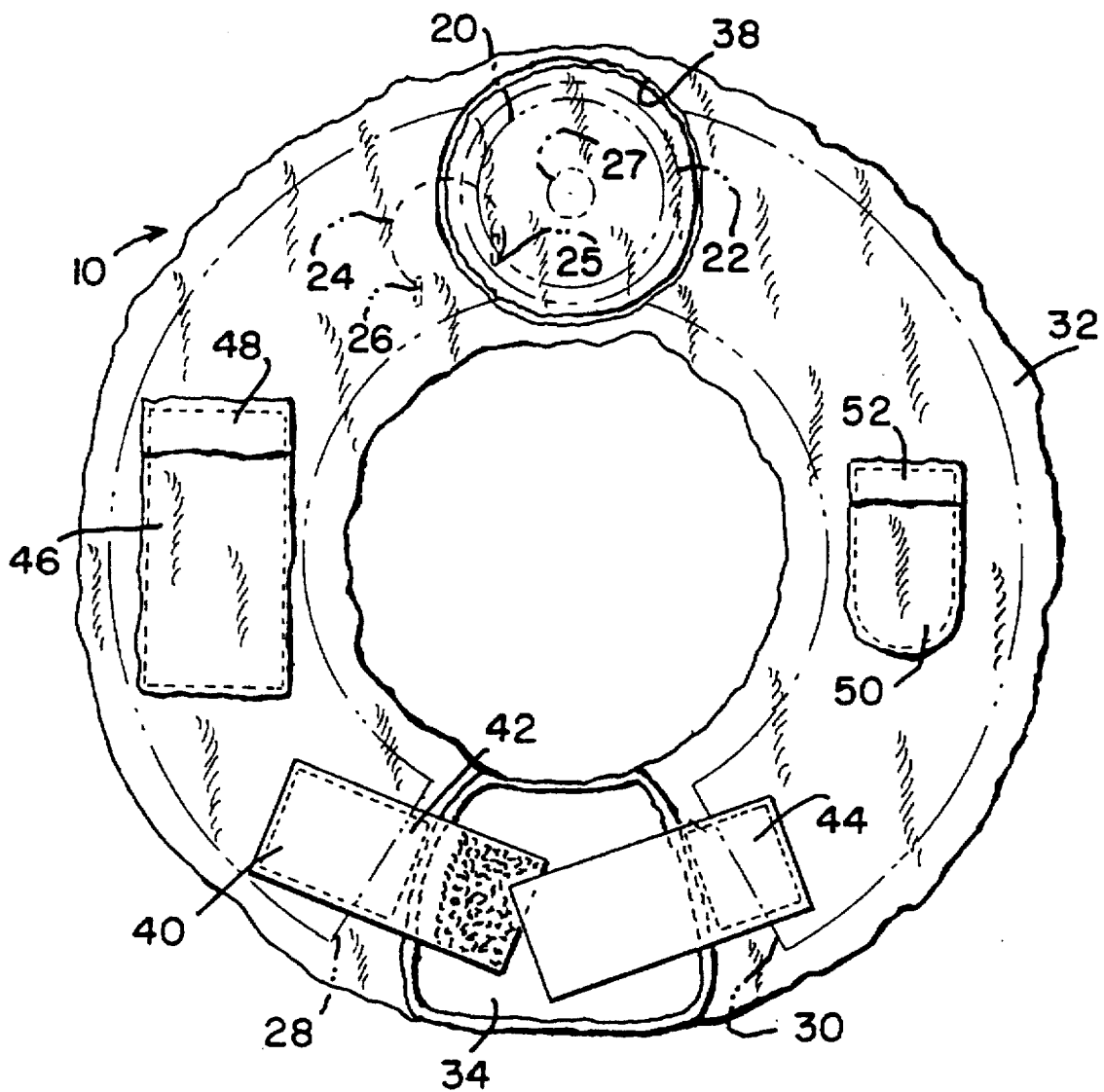
FIG. 4 is a side elevational view of the sheathing sleeve for the reservoir, the same showing the enclosed reservoir only in phantom.

FIG. 4 discloses a compliant, sheathing sleeve 32. Preferably, the sleeve 32 is formed of terry cloth, as the latter is especially absorbent. However, nylon, or other such material, would be serviceable as well. The sleeve 32 is substantially circular and has a horizontally-arranged opening 34. In addition, the sleeve 32 has an aperture 38 formed therein. The latter is provided to accommodate therethrough the tube 20 and cap 22, with the valve 27, of the reservoir 12. Secured to the opposite sides of the opening 34, by means of stitching 40, are strips 42 and 44 of hook and loop material, such as is sold under the trademark Velcro.

In use, the reservoir 12 is slid into the sleeve 32, through the opening 34, until the tube 20 and cap 22, with the valve 27, locate in the aperture 38. Strips 42 and 44 are then adhered together, to close up the opening 34. Then, the cap 22 can be removed, and the reservoir 12 can be filled with fresh water.

The runner or jogger will carry a pair of the inventions 10 on his or her wrists (or, optionally, about the ankles) as weights, and will have the drinking water always at hand. The circular dimension of the sleeve 32 can be fitted snugly about the wrist.

Runners and joggers, typically, are considerably dressed down for the exercise. Therefore, the sleeve 32 accommodates for the carriage of identification papers, medical alert cards, and such, as well as for the carriage of money. To this end, as shown in FIG. 4, the sleeve 32 has a first pocket 46 stitched thereon, with a suitable closure flap 48, in which to confine papers. A second pocket 50, also stitched to the sleeve 32, and having a like closure flap 52 is provided for the confinement therein of paper money or coin. The flaps 48 and 52, preferably, would also have Velcro material as well as the top edges of the pockets 46 and 50, although the same could be zippered or buttoned in an alternate embodiment.

While I have described my invention in connection with a specific embodiment thereof, it is to be understood that this is done only by way of example, and not as a limitation to the scope of the invention, as set forth in the objects thereof, and in the appended claims.

I claim:

1. A runner's wrist-borne weight and water dispenser, comprising:

a reservoir; wherein said reservoir has a flat top, with terminal ends, of arcuate conformation in plan;

said reservoir has a flat bottom, with terminal ends, of arcuate conformation in plan; and said reservoir has accordion-pleated sides; wherein said top, bottom and sides comprise means for self-supportingly encircling a portion of a wrist of a user;

said means comprise (a) inside diametrical surfaces of said top, bottom and sides, and (b) a gap obtaining between said terminal ends of said top and bottom; wherein said gap comprises means for accommodating a lateral insertion of such wrist portion into said self-supporting means;

said reservoir has an outlet; and a closure removably secured over said outlet.

* * * * *